United States Patent
Priyadarshan et al.

(10) Patent No.: US 8,370,330 B2
(45) Date of Patent: Feb. 5, 2013

(54) PREDICTING CONTENT AND CONTEXT PERFORMANCE BASED ON PERFORMANCE HISTORY OF USERS

(75) Inventors: Eswar Priyadarshan, West Roxbury, MA (US); Dan Marius Grigorovici, Pleasanton, CA (US); Ravikiran Chittari, Acton, MA (US); Prasenjit Mukherjee, Bangalore (IN); Omar Abdala, Cambridge, MA (US)

(73) Assignee: Apple Inc., Cupertino, CA (US)

( * ) Notice: Subject to any disclaimer, the term of this patent is extended or adjusted under 35 U.S.C. 154(b) by 285 days.

(21) Appl. No.: 12/790,668

(22) Filed: May 28, 2010

(65) Prior Publication Data
US 2011/0295846 A1    Dec. 1, 2011

(51) Int. Cl.
*G06F 7/00* (2006.01)
*G06F 17/30* (2006.01)

(52) U.S. Cl. ........ 707/722; 707/723; 707/737; 707/749; 707/752

(58) Field of Classification Search ............... 707/723, 707/737, 739, 748, 749, 751, 752, 722
See application file for complete search history.

(56) References Cited

U.S. PATENT DOCUMENTS

| | | | |
|---|---|---|---|
| 6,006,197 A | 12/1999 | d'Eon et al. | |
| 6,009,410 A | 12/1999 | LeMole et al. | |
| 6,286,005 B1 | 9/2001 | Cannon | |
| 7,428,538 B2 * | 9/2008 | Wen et al. | 1/1 |
| 7,693,827 B2 * | 4/2010 | Zamir et al. | 707/999.003 |
| 7,730,017 B2 | 6/2010 | Nance et al. | |
| 7,734,632 B2 | 6/2010 | Wang | |
| 7,792,858 B2 * | 9/2010 | Tang et al. | 707/780 |
| 7,882,045 B1 * | 2/2011 | Cole et al. | 706/12 |
| 7,882,046 B1 * | 2/2011 | Kizhakkekalathil et al. | 706/12 |
| 8,185,530 B2 * | 5/2012 | Zhao et al. | 707/737 |
| 8,234,276 B2 * | 7/2012 | Skinner | 707/735 |
| 2002/0161770 A1 | 10/2002 | Shapiro et al. | |
| 2004/0068435 A1 | 4/2004 | Braunzell | |
| 2004/0133480 A1 | 7/2004 | Domes | |
| 2007/0027762 A1 | 2/2007 | Collins et al. | |
| 2007/0061195 A1 | 3/2007 | Liu et al. | |
| 2007/0094066 A1 | 4/2007 | Kumar et al. | |
| 2007/0136457 A1 | 6/2007 | Dai et al. | |
| 2007/0260624 A1 | 11/2007 | Chung et al. | |

(Continued)

FOREIGN PATENT DOCUMENTS
WO 2009/099876 A2 8/2009

OTHER PUBLICATIONS
Pekka Orponen and Satu Elisa Schaeffer (2005), Local Clustering of Large Graphs by approximate Fiedler Vectors, pp. 524-533.*

(Continued)

*Primary Examiner* — Merilyn Nguyen
(74) *Attorney, Agent, or Firm* — Novak Druce Connolly Bove + Quigg LLP (57) ABSTRACT

Systems and methods are provided for selecting contexts for new invitational content and invitational content for new contexts. In particular, a performance history of delivered invitational content in known contexts is combined with similarity measures for the delivered invitational content, with respect to a new invitational content, to generate a list of potential contexts for the new invitational content. Similarly, a performance history of in known contexts with delivered invitational content can combined with similarity measures for known contexts, with respect to a new context, to generate a list of potential content for the new context. Further, a combination of these methods can be used to pair new invitational content with new contexts.

12 Claims, 6 Drawing Sheets

U.S. PATENT DOCUMENTS

| | | | |
|---|---|---|---|
| 2008/0065491 A1 | 3/2008 | Bakman | |
| 2008/0071929 A1 | 3/2008 | Motte et al. | |
| 2008/0249832 A1 | 10/2008 | Richardson et al. | |
| 2008/0250453 A1* | 10/2008 | Smith et al. | 725/39 |
| 2008/0294584 A1* | 11/2008 | Herz | 706/46 |
| 2009/0024554 A1* | 1/2009 | Murdock et al. | 706/48 |
| 2009/0281973 A1* | 11/2009 | Selinger et al. | 706/14 |
| 2010/0082423 A1 | 4/2010 | Nag et al. | |
| 2010/0114654 A1 | 5/2010 | Lukose et al. | |
| 2010/0125505 A1 | 5/2010 | Puttaswamy | |
| 2010/0161424 A1 | 6/2010 | Sylvain | |
| 2010/0169176 A1 | 7/2010 | Turakhia | |
| 2010/0306249 A1* | 12/2010 | Hill et al. | 707/769 |
| 2011/0166939 A1* | 7/2011 | Junkin et al. | 705/14.61 |
| 2011/0213655 A1* | 9/2011 | Henkin et al. | 705/14.49 |
| 2011/0246537 A1* | 10/2011 | Labbi et al. | 707/805 |
| 2011/0295892 A1* | 12/2011 | Evans et al. | 707/776 |

OTHER PUBLICATIONS

Moira Regelson and Daniel C. Fain, "Predicting Click-Through Rate Using Keyword Clusters," In Proceedings of the Second Workshop on Sponsored Search Auctions, EC'06, SSA2, Jun. 11, 2006, ACM, 2006.

Matthew Richardson, Ewa Dominowska and Robert Ragno, "Predicting Clicks: Estimating the Click-Through Rate for New Ads," Proceedings of the 16th international conference on World Wide Web, Banff, Alberta, Canada, May 8-12, 2007, SESSION: Advertisements & click estimates, pp. 521-529, ACM, 2007.

D. Hillard, S. Schroedl, E. Manavoglu, H. Raghavan and C. Leggetter, "Improving Ad Relevance in Sponsored Search," Proceedings of the third ACM international conference on Web search and data mining, WSDM'10, Feb. 4-6, 2010, SESSION: Ads, pp. 361-369, ACM, New York, New York, USA, 2010.

"Advertisement System, Method and Computer Program Product", IP.com Prior Art Database Disclosure, Pub No. IPCOM000138557D, dated Jul. 24, 2006, IP.com, Amherst, NY (Available online at http://priorartdatabase.com/IPCOM/000138557, last visited Aug. 30, 2010)., Jul. 24, 2006.

"Specific Media Behavioral Targeting Index", Specific Media, Inc., Irvine, CA, 2010, Available online at http://www.specificmedia.com/behavioral-targeting.php.

Langheinrich, Marc et al., "Unintrusive Customization Techniques for Web Advertising", Computer Networks: The International Journal of Computer and Telecommunications Networking, vol. 31, No. 11, May 1999, pp. 1259-1272, Elsevier North-Holland, Inc., New York, NY, 1999., May 11, 1999, 1259-1272.

Shaikh, Baber M. et al., "Customized User Segments for Ad Targeting", IP.com Prior Art Database Disclosure, Pub No. IPCOM000185640D, dated Jul. 29, 2009 UTC, IP.com, Amherst, NY (Available online at http://priorartdatabase.com/IPCOM/000185640, last visited Aug. 30, 2010)., Jul. 29, 2009.

* cited by examiner

PREDICTING CONTENT AND CONTEXT PERFORMANCE BASED ON PERFORMANCE HISTORY OF USERS

FIELD

The following relates to electronic content delivery and more specifically relates to systems and methods for predicting the performance of contents and contexts based on a performance history of users.

BACKGROUND

Computer applications, websites, or other electronic content including offers for products and services generally require a user to explicitly select and/or interact with one or more portions of the content being presented to generate a conversion (e.g., completion a sale or purchase, submission of information to a content provider, causing delivery of additional information to the user or any other pre-defined response for the content). For example, an advertisement for a product or service can require the user to select the advertisement content and navigate to the online store offering the product for sale. At the online store, the user can then enter information to purchase or obtain additional information regarding the product or service.

In many types of electronic content maintained by (primary) content providers, invitational content (i.e., the portions of the content offering products and services) are generally provided by other (secondary) content providers. The combination of content from the primary content providers and invitational content from the secondary content providers may be done directly by the primary content providers or via an agent. Accordingly, the invitational content in these portions varies over time, depending on the various arrangements between the primary content provider and the various secondary content providers. For example, each of the secondary content providers may arrange for a number of impressions of their invitational content. Further, secondary content providers may also arrange to have their invitational content associated only with a particular context.

Secondary content providers typically select the primary content providers for their invitational content using a number of different approaches. For example, secondary content provider may select primary content providers which are known to be associated with content similar or related to their invitational content. Alternatively, secondary content providers can select primary content providers that are known to be associated with the target audience for the invitational content. Absent such knowledge, secondary content providers typically rely on random targeting.

SUMMARY

The present technology provides systems and methods for selecting contexts for new invitational content and invitational content for new contexts based on a performance history of users with other invitational contents in other contexts. In particular, a performance history of previously delivered invitational content in known contexts is combined with similarity measures for the delivered content, with respect to a new invitational content, to generate a list of potential contexts for the new invitational content. Similarly, the performance history can also be combined with similarity measures for the known contexts, with respect to a new context, to generate a list of potential invitational content for the new context. Further, a combination of these methods can be used to pair new invitational content with new contexts.

In the various embodiments, the process begins with generation of a database from the performance history of the delivered content in the known contexts. The relational database is configured to include information for identifying the delivered invitational content, the known contexts, content metadata, and context metadata. Additionally, the database is configured to include other data generated based on the performance history, the content metadata, and context metadata. In particular, this data includes information for identifying resulting clusters of delivered invitational content and known contexts, content/cluster rank values measuring a relation between the clusters and the existing ads, and context/cluster rank values measuring a relation between the clusters and the known contexts.

The present technology provides for pairing of invitational content and contexts as follows. In the case of identifying known contexts for a new invitational content, the new invitational content is first compared to the delivered invitational content to obtain similarity/rank values and identify the most similar delivered content. Once the most similar delivered invitational content is identified, the content/cluster rank values are used to identify the most relevant clusters for the identified content. Thereafter, the context/cluster rank values are used to identify known contexts for the new invitational content. Finally, an ordered list of the identified contexts can be generated based on the various rank values associated with these contexts. The ordered list can be directly used to select combine content and contexts or to generate rules for such combining.

A similar process can be used to identify previously delivered invitational content for a candidate context. In such a process, the candidate context is first compared to the known contexts to obtain similarity/rank values and identify the most similar known contexts. Once the most similar known contexts are identified, the context/cluster rank values are used to identify the most relevant clusters for the identified contexts. Thereafter, the content/cluster rank values are used to identify delivered invitational content for the candidate context. Finally, an ordered list of this identified content can be generated based on the various rank values associated with this identified content. The ordered list can be directly used to select combine content and contexts or to generate rules for such combining.

DESCRIPTION

Various embodiments of the disclosed methods and arrangements are discussed in detail below. While specific implementations are discussed, it should be understood that this is done for illustration purposes only. A person skilled in the relevant art will recognize that other components, configurations, and steps may be used without parting from the spirit and scope of the disclosure.

Figure 1:
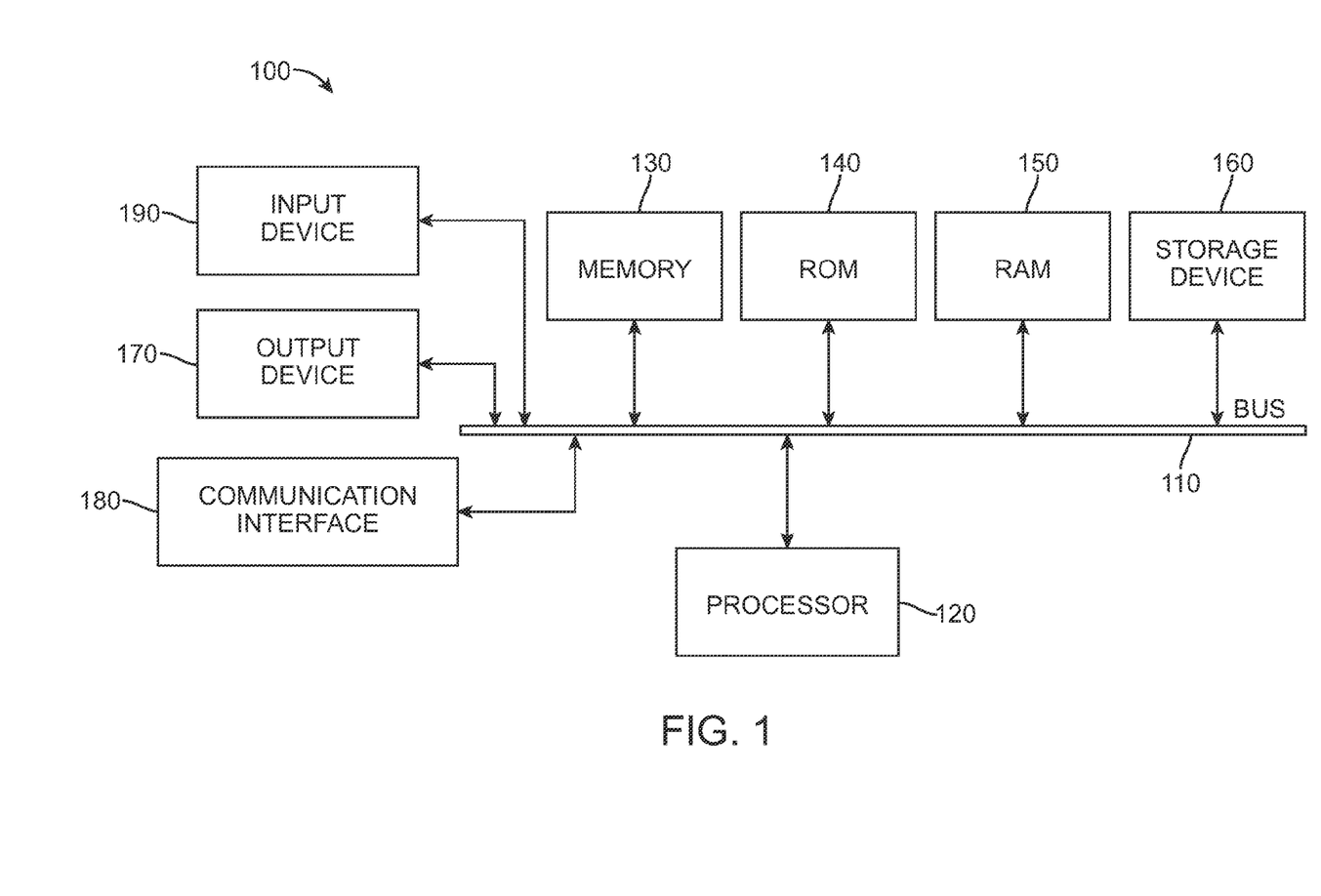
FIG. 1 illustrates an example computing device.

With reference to FIG. 1, a general-purpose computing device 100 which can be portable or stationary is shown, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the system may operate on a computing device with more than one CPU 120 or on a group or cluster of computing devices networked together to provide greater processing capability. The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. In one aspect, a hardware module that performs a particular function includes the software component stored in a tangible computer-readable medium in connection with the necessary hardware components, such as the CPU, bus, display, and so forth, to carry out the function. The basic components are known to those of skill in the art and appropriate variations are contemplated depending on the type of device, such as whether the device is a small, handheld computing device, a desktop computer, or a large computer server.

Although the exemplary environment described herein employs a hard disk, it should be appreciated by those skilled in the art that other types of computer readable media which can store data that is accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The device output 170 can also be one or more of a number of output mechanisms known to those of skill in the art. For example, video output or audio output devices which can be connected to or can include displays or speakers are common. Additionally, the video output and audio output devices can also include specialized processors for enhanced performance of these specialized functions. In some instances, multimodal systems enable a user to provide multiple types of input to communicate with the computing device 100. The communications interface 180 generally governs and manages the user input and system output. There is no restriction on the disclosed methods and devices operating on any particular hardware arrangement and therefore the basic features may easily be substituted for improved hardware or firmware arrangements as they are developed.

For clarity of explanation, the illustrative system embodiment is presented as including individual functional blocks (including functional blocks labeled as a "processor"). The functions these blocks represent may be provided through the use of either shared or dedicated hardware, including, but not limited to, hardware capable of executing software. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) for storing software performing the operations discussed below, and random access memory (RAM) for storing results. Very large scale integration (VLSI), field-programmable gate array (FPGA), and application specific integrated circuit (ASIC) hardware embodiments may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits.

Figure 2:
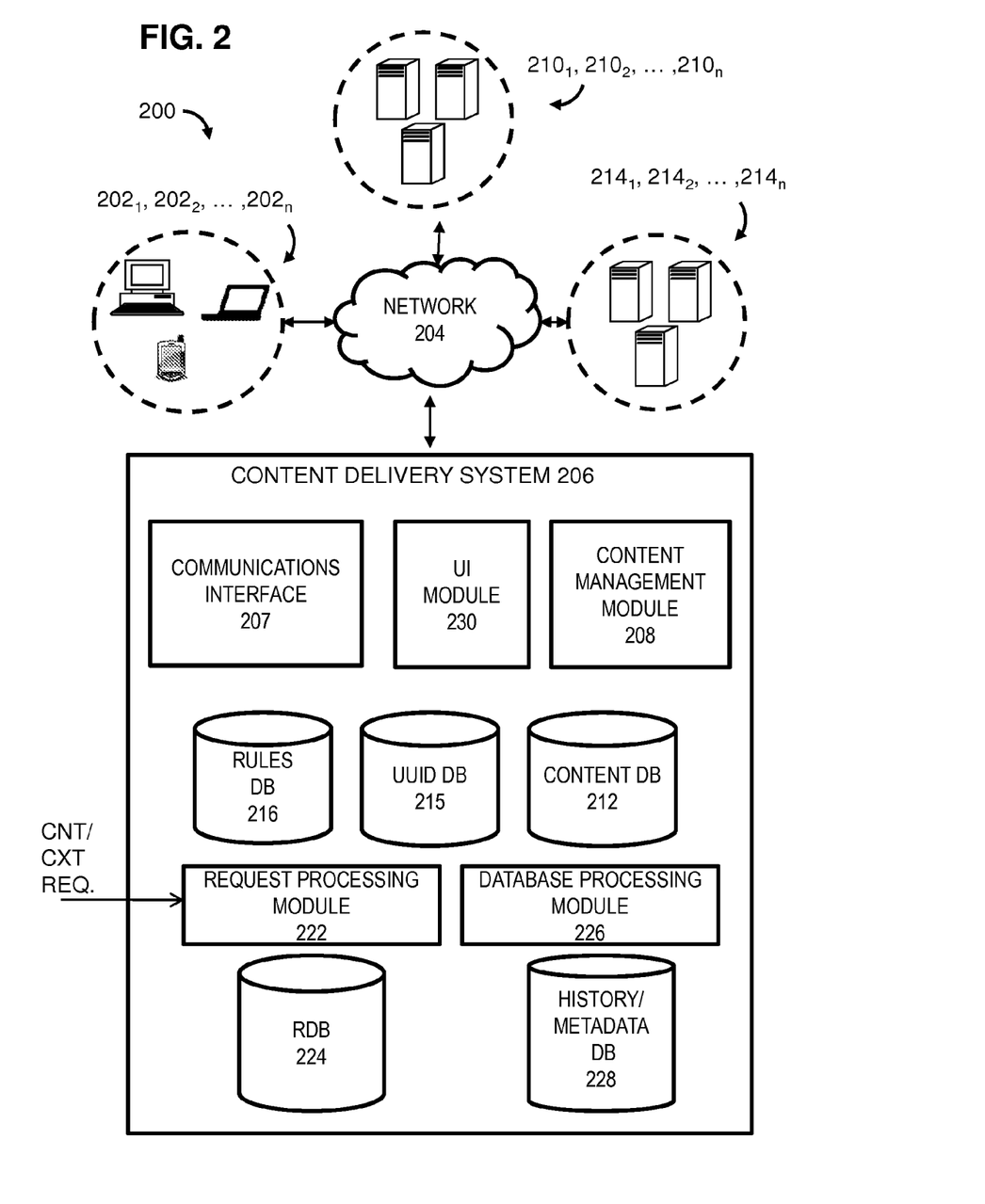
FIG. 2 illustrates an exemplary system embodiment.

The present system and method is particularly useful for assembling and delivering content packages to the user terminals, where an invitational content from secondary content providers, such as advertisements, announcements, and other types of propaganda and inducements, is selected for the content package and thereafter delivered. A system 200 is illustrated in FIG. 2 wherein electronic devices communicate via a network for purposes of exchanging content and other data. In some embodiments, the present system and method are carried out on a local area network such as that illustrated in FIG. 2. However, the present principles are applicable to a wide variety of network configurations that facilitate the intercommunication of electronic devices. For example, each of the components of system 200 in FIG. 2 can be implemented in a localized or distributed fashion in a network.

In system 200, a content package is delivered to user terminals $202_1 \ldots 202_n$ (collectively "202") connected to a network 204 by direct and/or indirect communications with a content delivery system 206. In particular, the content delivery system 206 receives a request for an electronic content, such as a web page, from one of user terminals 202. Thereafter, the content delivery system 206 assembles a content package in response to the request and transmits the assembled content package to the requesting one of user terminals 202. The content in the assembled content package can include text, graphics, audio, video, or any combination thereof. Further, the assembled content packages can includes invitational content designed to inform or elicit a pre-defined response from the user and that can vary over time, such as advertisements. The content delivery system can include a communications interface 207 to facilitate communications with the user terminals 202 and any other components in system 200.

The content delivery system 206 includes a content management module 208 that facilitates generation of the assembled content package that includes invitational content. Specifically, the content management module can combine content from one or more one or more primary content providers $210_1 \ldots 210_n$ (collectively "210") and content from one or more secondary content providers $214_1 \ldots 214_n$ (collectively "214") to generate the assembled content package for the user terminals 202.

Although, primary and secondary providers 210, 214 are presented herein as discrete, separate entities, this is for illustrative purposes only. In some cases, the primary and secondary providers 210, 214 can be the same entity. Thus, a single entity may define and provide both static and time-varying content.

For example, in the case of a web page being delivered to a requesting one of user terminals 202, the content management module 208 can assemble a content package by requesting the data for the web page from one of the primary content providers 210 maintaining the web page. For the time-varying invitational content on the web page provided by the secondary content providers 214, the content management module 208 can request the appropriate data generally according to the arrangement between the primary and secondary content providers 210 and 214. For example, the invitational content from the secondary providers 214 can be selected based on a guaranteed number of impressions. Alternatively, the invitational content from the secondary providers 214 can also be selected based on the context of the web page. However, any other arrangements and configuration for selecting invitational content from the secondary providers 210 can also be used.

As used herein, the term "context" refers to a target environment or audience for an invitational content and associated with one or more contextual characteristics. Contextual characteristics can include channel characteristics, demographic characteristics, and spatial-temporal characteristics, to name a few. Channel characteristics can define the specific delivery channel being used to deliver a content package. For example, channel characteristics can include a type of electronic content, a type of device or user terminal, a carrier or network provider, or any other characteristic that defines a specific delivery channel for the content package. Spatial-temporal characteristics can define a location, a date, a time, or any other characteristic that defines a geographic location and/or a time for delivery of the content package. Demographic characteristics can define personal and/or socio-economic characteristics of the user requesting the content package.

Although the content management module 208 can be configured to request that data be sent directly from content providers 210 and 214, a cached arrangement can also be used to improve performance of the content delivery system 206 and improve overall user experience. That is, the content delivery system 206 can include a content database 212 for locally storing/caching content maintained by content providers 210 and 214. The data in the content database 212 can be refreshed or updated on a regular basis to ensure that the content in the database 212 is up to date at the time of a request from a user terminal. However, in some cases, the content management module 208 can be configured to retrieve data directly from content providers 210 and 214 if the metadata associated with the data in content database 212 appears to be outdated or corrupted.

In the various embodiments, the one or more databases described herein can be implemented any type of data structures. Such data structures include, but are not limited to data structures for relational databases, key/value stores, graph databases, hierarchical databases, and distributed or columnar stores. Accordingly, although the various embodiments described herein may refer to specific data structures in some embodiments, in other embodiments such data structures can be substituted for any other type of database structure.

In the various embodiments, the content delivery 206 can also include a unique user identifier (UUID) database 215 that can be used for managing sessions with the various user terminal devices 202. The UUID database 215 can be used with a variety of session management techniques. For example, the content delivery system 206 can implement an HTTP cookie or other conventional session management methods (e.g., IP address tracking, URL query strings, hidden form fields, window name tracking, authentication methods, and local shared objects) for user terminals 202 connected to content delivery system 206 via a substantially persistent network session. However, other methods can be used as well. For example, in the case of mobile devices or other types of user terminals connecting using multiple or non-persistent network sessions, multiple requests for content from such devices may be assigned to a same entry in the UUID database 215. Such an assignment can be provided by analyzing requesting device attributes in order to determine whether such requests can be attribute to a same device. Such attributes can include device or group-specific attributes.

As described above, content maintained by the content providers 210 and 214 can be combined and/or presented according a predefined arrangement between the two content providers, which can be embodied as a set of rules. In an arrangement where the content delivery system assembles the content package from multiple content providers, these rules can be stored in a rules database 216 in content delivery system 206 and content management module 208 can be configured to assemble the content package for user terminals 202 based on these rules. The rules can specify how to select content from secondary content providers 214 and the primary content providers 210 in response to a request from one of user terminals 202. For example, in the case of a web page maintained by one of primary providers 210 and including variable advertisement portions, the rules database 216 can specify rules for selecting one of the secondary providers 214. The rules can also specify how to select specific content from the selected one of secondary providers 214 to be combined with the content provided by one of primary providers 210. Once assembled, the assembled content package can be sent to a requesting one of user terminals. However, the content package is not limited to the content from content providers 210 and 214. Rather, the content package can include other data generated at the content delivery system 206.

A main concern with the operation of content delivery systems is how to generate the rules for rules database 216. In particular, one issue is how to generate rules for new invitational content and new contexts. As described above, conventional methods rely on the secondary provider having some information regarding the relationship between the content and context to be combined in order to make an intelligent choice. However, in the case of new content and contexts, no such history exists. As a result, new content and new contexts are commonly combined with other content and contexts using a random targeting method, as described above. Thereafter, the performance of the new content and/or new contexts can be evaluated and the targeting can be adjusted based on this evaluation. The process can be repeated until a desired level of performance is reached. However, this can result in a significant investment of time and cost.

To address these issues, the present technology provides systems and methods for selecting, with a relatively high degree of confidence, contexts for new invitational content and invitational content for new contexts based on a performance history of other content and contexts. In particular, a performance history of delivered invitational content in known contexts is combined with similarity measures for the delivered invitational content, with respect to a new invitational content, to define a list of potential contexts for the new invitational content. Similarly, the performance history can also be combined with similarity measures for existing contexts, with respect to a new context, to define a list of potential invitational content for the new context. Further, a combination of these methods can be used to generate rules for pairing new invitational content with new contexts.

In system 200, the lists of potential content and context, and any related rules, can be generated using a request processing module 222. In system 200, the request processing module 222 is operable to receive requests for generating rules for selecting content to combine with a context or for selecting one or more contexts for particular content. In response to such requests, the request processing module 222 can perform an evaluation based on data stored in a relational database (RDB) 224 and thereafter provide a ranked or ordered list of the invitational content or contexts needed for fulfilling the requests. The request processing module 222 can then access the data in RDB 224 in order to specify and/or modify rules in rules database 216. The new and/or updated rules can then be used by content management module 208, as described above, for associating specific invitational content with one or more contexts.

In system 200, RDB 224 is maintained using a database processing module 226. Specifically, the database processing module 226 retrieves performance history and metadata from the history/metadata database 228 for invitational content previously delivered by the content delivery system 206 (delivered invitational content) to user terminals 202, each of which is associated with one or more contexts (known contexts). Thereafter, the database processing module generates data for the RDB 224, including data entries associated with the delivered invitational content and the known contexts and indexing or relational model information for the data entries. Operation of the database processing module is described below in greater detail with respect to FIG. 3.

Figure 3:
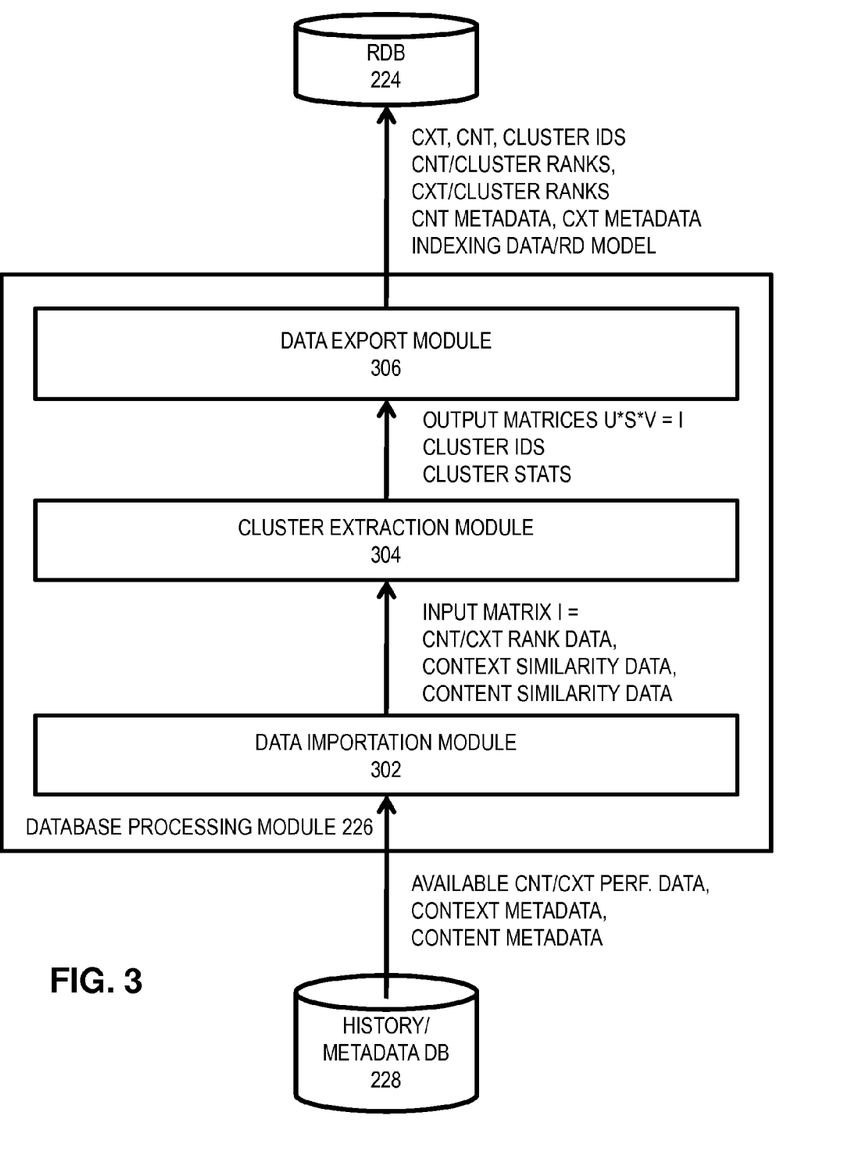
FIG. 3 is a detailed schematic of the database processing module in FIG. 2.

FIG. 3 is a detailed schematic of the database processing module 226 in FIG. 2. In operation, the database processing module 226 retrieves and/or receives information from the history/metadata database 228. Specifically, the information for database processing module 226 includes a performance history for the invitational content, including an identification of the known contexts associated with the delivered invitational content. Additionally, the information includes metadata for the delivered invitational content and the known contexts.

As shown in FIG. 3, the information from the history/metadata database 228 is first processed by a data import module 302. At data import module 302, several sets of data are generated. A first set is a content-rank data set (CNT/CXT RANK DATA). That is, for each of the contexts specified in the performance history, ranking values for the invitational content with respect to each of these contexts can be generated. These ranking values can be based on click-through rates, a number of impressions, or any other performance measure for the invitational content with respect to each of the contexts in the performance history. It is worth noting that in some circumstances, some of the delivered invitational content will not be associated with each and every context specified in the performance history. Accordingly, a ranking value for one or more contexts in the content-rank data may be a null value (i.e., 0) or not be provided for some of the delivered invitational content.

A second set of data consists of content similarity values. That is, values indicating the similarity of each of the delivered invitational content with respect to each other of the delivered invitational content in the performance history. A third and final set of data consists of context similarity values. That is, values indicating the similarity of a known context in the performance history with respect to each other known context in the performance history. The content and context similarity values can be computed in a variety of ways. In an exemplary method, the associated content metadata can be used to produce a bag-of-words representation for each of the delivered invitational content. The content similarity values can then be computed as Jaccard indices or similarity coefficients:

$$J(A,B)=|A\cap B|/|A\cup B|, \quad (1)$$

where A is the bag-of-words for a first delivered invitational content, B is the bag-of-words for a second delivered invitational content, $\cap$ is the set intersection operator, and $\cup$ is the set union operator. The context similarity values can be computed in substantially the same manner based on the context metadata associated with the known contexts in the performance history.

The first, second, and third datasets can then be output as a single dataset to a cluster extraction module 304 of database processing module. For example, in one embodiment, the datasets can be used to form first, second, and third matrices. The cross product of these matrices than then be computed to generate a single input matrix for cluster extraction module 304.

Once the input dataset or matrix is received by the cluster extraction module 304, the cluster extraction module can perform several operations using this input. First, the cluster extraction module can identify clusters in the input dataset. That is, the cluster extraction module can identify the groups of the delivered invitational content and the known contexts that are most closely related. This is conceptually illustrated in FIGS. 4A and 4B.

Figure 4A:
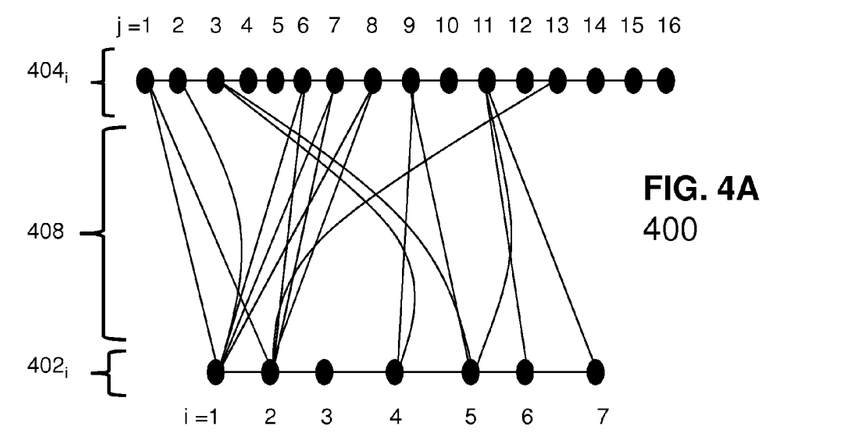
FIG. 4A is a diagram showing schematically the relationship between delivered invitational content and the known contexts.

FIG. 4A is a diagram 400 showing schematically the relationship between delivered invitational content and the known contexts. As shown in FIG. 4A, each one of the delivered invitational content $402_i$ (i=1 . . . n) can be associated with one or more of the known contexts $404_j$ (i=1 . . . m), where the associations are represented by connecting lines 408. In addition to representing an association between one of content $402_i$ and one of contexts $404_j$, each of connecting lines 408 also represents different levels of performance for the association. For example, the one of connecting lines between content $402_1$ and context $404_1$ can represent a click-through rate for content $402_1$ with respect to context $404_1$. Similarly, the one of connecting lines between content $402_1$ and context $404_2$ can represent a click-through rate for content $402_1$ with respect to context $404_2$ and so forth. Although the connecting lines 408 are shown in FIG. 4A as being the same, this is for illustrative purposes only. In most instances, each of connecting lines will represent a different amount or level of performance for a delivered invitational content at one of known contexts. That is the click-through rates associated with content $402_1$ with respect to contexts $404_1$ and $404_2$ can be the same or different.

Figure 4B:
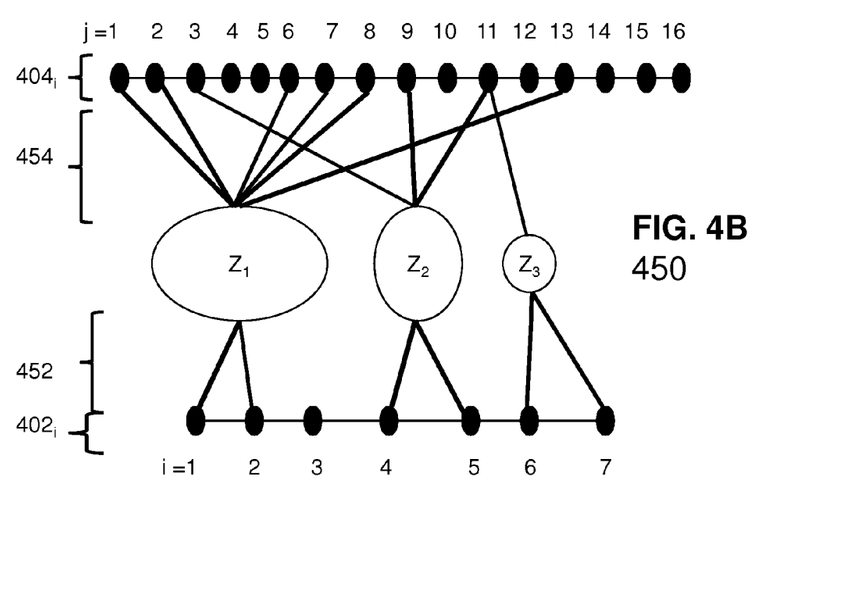
FIG. 4B is a diagram showing schematically the clusters for the contents and the contexts in FIG. 4A.

Based on the amounts of performance represented by connecting lines 408 and the similarity values for the content $402_i$ and the contexts $404_j$, clusters can be identified, as shown in FIG. 4B. FIG. 4B is a diagram 450 showing schematically the clusters for the contents $402_i$ and the contexts 404 in FIG. 4A. As shown in FIG. 4B, clusters $Z_1$, $Z_2$, $Z_3$ are identified. Each of these clusters defines a group consisting of one or more of the delivered invitational content $402_i$ and one or more of the known contexts $404_j$. Further, each of these clusters is associated by content/cluster rank values 452 and context/cluster rank values 454, as described below.

Effectively, each cluster identifies similar content and similar contexts that are closely related. As a result, each cluster defines, for each of the contents $402_i$ in the cluster, a portion of the contexts 404 that could potentially be used as contexts for the contents $402_i$ in the cluster. Additionally, each cluster defines, for each one of the contexts 404 in the cluster, a portion of the contents $402_i$ that could potentially be used as contents for the contexts $404_j$ in the cluster. For example, cluster $Z_1$ includes contents $402_1$ and $402_2$ and contexts $404_1$, $404_2$, $404_6$, $404_7$, $404_8$ and $404_{13}$. Thus, any of contexts $404_1$, $404_2$, $404_6$, $404_7$, $404_8$ and $404_{13}$ could potentially be used for any of contents $402_1$ and $402_2$ and vice versa.

Referring back to FIG. 3, the cluster extraction module 304 can identify the clusters. In one embodiment, the clusters can be identified via a modified extended Fiedler method. However, other methods can be used to identify the clusters, such as k-means, nearest neighbor, or collaborative filtering techniques. In the modified extending Fiedler method, the input matrix (I) from the data import module 302 is decomposed using a singular value decomposition (SVD) method ($I=U*S*V^T$). Thereafter, the signs in the singular vector matrices from the decomposition ($U, V^T$) can then be used to identify the clusters of delivered invitational content and the clusters of known contexts. The final clusters including both content and context can then be determined, for example, by matching up the content and context clusters to define a single cluster.

Typically, conventional signs-based SVD algorithms fail to provide a distance measure to assess goodness of the identified clusters and intra and inter-variability of the members of the identified clusters. Additionally, conventional signs-based SVD algorithms use a hard clustering method. That is, no overlapping clusters are allowed. However, in most circumstances, such overlaps are quite typical.

Accordingly, in the various embodiments, the conventional signs-based SVD algorithm is extended to select additional members for the clusters using a distance measure based on the moments of a probability distribution function. For example, in one embodiment, a Gaussian probability distribution function can be used. However, any type of probability distribution function can be used in the various embodiments. In operation, the members identified using the SVD algorithm (or any other clustering technique) are used to identify a probability distribution function. Thereafter, the first (mean $\mu$) and second order (variance $\sigma^2$) moments of the probability function are used to identify other members for the clusters. For example, the mean and the variance are used to generate a distance measure, such as $v \pm n \times \sigma$, where $n>0$ and is selected such that at least the members of the clusters in from the SVD are included. Such an approach therefore allows the use of the deterministic properties of the SVD method (definitive and reduced dimension space), while enhancing it to allow soft clustering. Further, performance metrics (statistical) are attached to each cluster, thus allowing us to assess their goodness. As a result, the output of at the cluster extraction module 304 identifies the clusters and the statistical characteristics of each cluster, specifically the variance and mean for the clusters. The cluster extraction module 304 can then forward the output matrices, the identified clusters, and the statistical characteristics of the clusters to a data export module 306.

It is worth noting that since Fiedler methods generally result in normalized matrices for identifying the clusters, the data associated with the content and contexts in the input matrix is effectively flattened, allowing this data to be directly combined and a single distance measure to be used for both content and context data. In other methods, scaling or normalization techniques can be used to map the content into the context space or vice versa to provide such flattening.

As noted above, some of the delivered invitational content will not have any performance history data that associates it with some of the existing contexts and vice versa. Accordingly, no data may be available for estimating the performance for some combinations of the delivered invitational content and the existing contexts. Thus, such incomplete data typically limits the usefulness of approaches in which content and/or context is selected based on performance with similar content or in similar contexts. In the various embodiments, the cluster extraction process resolves such issues. In particular, the SVD and the modified extended Fiedler methods described above essentially result in matrices that define the relationship between each of existing contexts and each of the previously delivered invitational content. Conceptually, the similarity values are used to create a version of the input matrix in which the empty or null rank values of the input matrix are populated. Accordingly, the clusters will include contents or contexts that would have been otherwise excluded due to the missing performance data. As a result, similarity-based selection of content and/or context can be performed with a high degree of confidence, as a complete set of relationship data is provided.

The data export module 306 is operable to generate the data set for inclusion in the RDB 224. In particular, the data export module 306 defines a data set that identifies the clusters, the delivered invitational content and the known contexts associated with each of the clusters, the metadata associated with the delivered invitational content and the known contexts, and ranking values for the delivered invitational content and the known contexts, with respect to the clusters. Further, the data export module 306 generates a relational model or indexing information for the data set, to facilitate lookup of information by contents, contexts, or clusters. Once the dataset is delivered the RDB 224, the request processing module 222 can begin processing requests and generating rules for rules database 216. This process is described in greater detail below with respect to FIGS. 5 and 6.

As described above, the data export module 306 is configured to include in the output data set for RDB 224 a set of ranking values for the delivered invitational content and the known contexts, with respect to the clusters. These ranking values can be calculated based on the cluster statistics obtained from the cluster extraction module 304. For example, mean and variance values computed by the cluster extraction module can be used to compute a standard or Z-score for each of the contents and contexts associated with a cluster. These scores can then be used as the ranking values or as input for a ranking function to obtain the ranking values.

Figure 5:
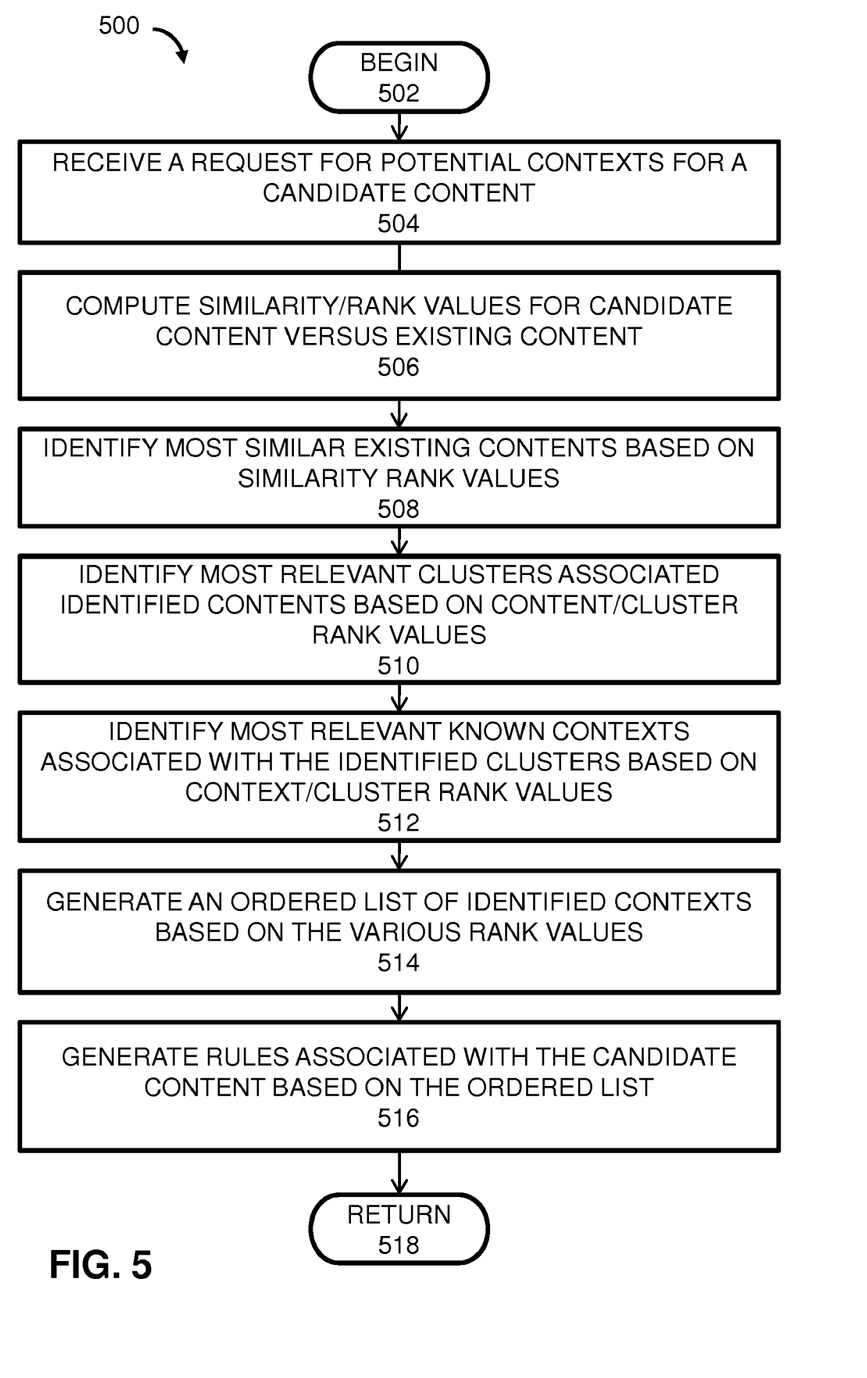
FIG. 5 is a flowchart of steps in an exemplary method for constructing rules for a content delivery system.

Referring now to FIG. 5, there is provided a flowchart of steps in an exemplary method 500 for associating new invitational content with contexts in a content delivery system. Method 500 begins at step 502 and continues on to step 504. At step 504, a request is received at request processing module 222 for identifying contexts for a new or candidate invitational content. Such new invitational content can be a single new content (e.g., a single advertisement) or a collection of new content (e.g., multiple advertisements for an electronic campaign).

Upon receipt of the request at step 504, the method 500 continues to step 506. At step 506, the new invitational content can be compared to the delivered invitational content in the RDB 224 to obtain similarity values for the new content versus the delivered content in the RDB 224. That is, the metadata associated with the new invitational content can be compared to the metadata associated with the delivered invitational content. Such a comparison can be performed in a variety of ways. In one embodiment, the similarity values can be computed in substantially the same fashion as that described above with respect to Equation (1).

Once the similarity values are obtained at step 506, the delivered content that is most similar to the new invitational content can be selected at step 508. The most similar content can be selected in a variety of ways. For example, in some embodiments, a fixed number of the delivered invitational content associated with the highest similarity values with respect to the candidate or new invitational content can be selected. In other embodiments, a threshold value can be selected. Therefore, any of the delivered invitational content associated with the similarity values at or above this threshold value can be selected. In yet other embodiments, a combination of these approaches can be used to limit the number of invitational content selected or to ensure a minimum number is selected. Following the selection at step 508, the method 500 can proceed to step 510.

At step 510, the clusters most relevant to the identified content from step 508 can be identified. That is, the delivered invitational content identified or selected at step 508 can be used with RDB 224 to identify associated clusters. In some embodiments, all of the associated clusters can be identified. In other embodiments, only a portion of the associated clusters can be identified. In such embodiments, in addition to identifying clusters associated with the content identified at step 508, the content/cluster rank values for these clusters, with respect to the content identified at step 508, can also be retrieved from the RDB 224. Thereafter, the most relevant clusters can be selected based on these rank values. For example, in some embodiments, a fixed number of the clusters associated with the highest content/cluster rank values can be selected. In other embodiments, a threshold value can be provided. Therefore, any of the clusters in RDB 224 associated with the content/cluster rank values at or above this threshold value can be selected. In yet other embodiments, a combination of these approaches can be used to limit the number of clusters identified or to ensure a minimum number is identified. Following the identification at step 510, the method 500 can proceed to step 512.

At step 512, the known contexts most relevant to the identified clusters from step 510 can be identified. That is, the identified clusters at step 510 can be used with RDB 224 to identify associated contexts. In some embodiments, all of the associated contexts can be identified. In other embodiments, only a portion of the associated contexts can be identified. In such embodiments, the context/cluster rank values for these contexts can also be retrieved from the RDB 224 in addition to identifying contexts associated with the clusters identified at step 510. Thereafter, the most relevant contexts can be selected based on these rank values. For example, in some embodiments, a fixed number of the contexts associated with the highest context/cluster rank values can be selected. In other embodiments, a threshold value can be provided. Therefore, any of the contexts in RDB 224 associated with the context/cluster rank values at or above this threshold value can be selected. In yet other embodiments, a combination of these approaches can be used to limit the number of contexts identified or to ensure a minimum number are identified. Following the identification at step 512, the method 500 can proceed to step 514.

Once the contents, contexts, and clusters are identified at step 508-512, an order or ranked list of the contexts identified at step 512 can be generated at step 514. The ordered rank list generated at step 514 provides a list of the known contexts that are likely to be most relevant for purposes of the new invitational content in the request since contexts selected that are associated with clusters. The ordered list can be generated based on the similarity values obtained at step 506, the content/cluster rank values in the RDB 224 associated with the content identified at step 508 and the clusters identified at step 510, and the context cluster rank values associated with the contexts identified at step 512 and the clusters identified at step 510. Thereafter, based on the ordered list at step 514, the request processing module 222 can generate or update rules database 216 at step 516. Method 500 can then resume previous processing at step 518, including repeating method 500.

Figure 6:
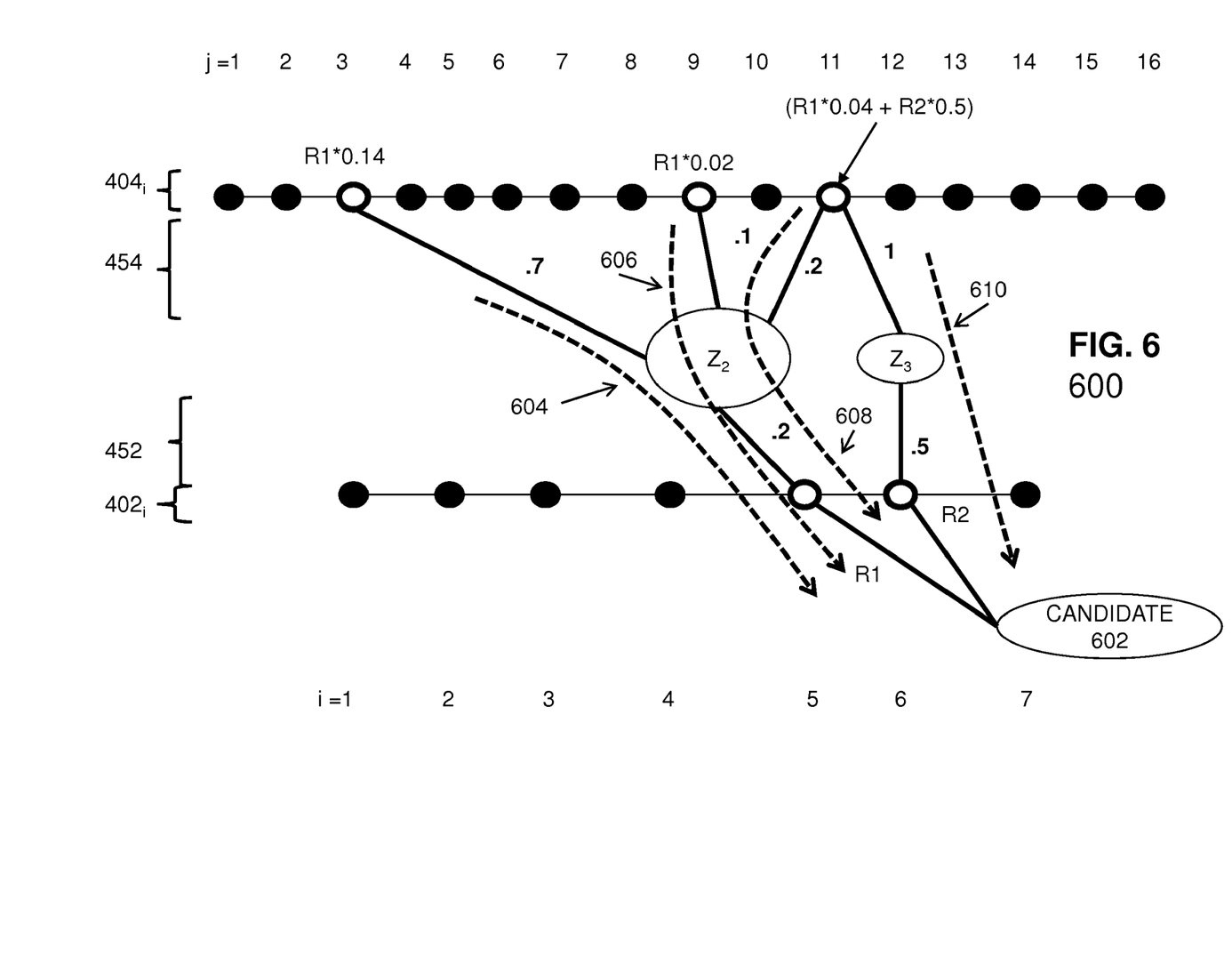
FIG. 6 is a schematic diagram illustrating computation of total rank values for identified contexts based on the clusters identified in FIG. 4B.

The ordered rank list can be generated at step 514 based on an aggregate of the various rank values associated with the contexts identified at step 514. This is conceptually illustrated with respect to FIG. 6. FIG. 6 is a schematic diagram 600 illustrating computation of total rank values for identified contexts based on the clusters identified in FIG. 4B. First, a candidate invitational content 602 is provided. In accordance with step 506 above, similarity/rank values are computed for the candidate content 602 versus the delivered content 402 and the highest ranking (i.e., most similar) ones of the delivered content 402 are selected in accordance with step 508. For explanatory purposes, the example in FIG. 6 shows only the two highest ranking ones of content 402. Specifically, content $402_5$ and $402_6$, having similarity/rank values of R1 and R2, respectively, are selected based on the similarity/rank values.

As further described above with respect to step 510, for each of content $402_5$ and $402_6$, the most relevant clusters can then be identified. For example, the selection can be based on a threshold value or a minimum number of clusters, as described above. Specifically, clusters $Z_2$ and $Z_3$, each associated with content $402_5$ and $402_6$, respectively, and having content/cluster rank values of 0.2 and 0.5, respectively. Thereafter, as described above with respect to step 512, for each of clusters $Z_2$ and $Z_3$, the most relevant contexts can be identified. For example, the selection can be based on a threshold value or a minimum number of contexts, as described above. Specifically, contexts $404_3$, $404_9$, and $404_{11}$ are identified for cluster $Z_2$, each associated with context/cluster rank values of 0.7, 0.1, and 0.2, respectively. With respect to $Z_3$, context $404_{11}$, associated with a context/cluster rank value of 1.0, is identified.

Once the portions of content $402_i$, clusters $Z_1$-$Z_n$ and contexts $404_j$ associated with the candidate content 602 are identified, a total rank value can be computed for each of the identified ones of the contexts $404_3$, $404_9$, and $404_{11}$. Specifically, a total rank value for each of the identified contexts 404 can be computed as the sum of different combinations of rank values associated with the contents 402 and clusters associated with each of the identified context. For example, as shown in FIG. 6, one or more rank paths 604, 606, 608, and 610 can be identified for the ones of the contexts 404 identified at step 512 in method 500. That is for each of contexts $404_3$, $404_9$, and $404_{11}$, each combination of a one of the identified clusters and a one of the identified contents is identified. In FIG. 6, a rank path 604 for context $404_3$ would consist of cluster $Z_2$ and content $402_5$. Similarly, the rank path 606 for content $404_9$ would consist of cluster $Z_2$ and content $402_5$. Finally, for content $404_{11}$, two rank paths, paths 608 and 610, are provided. Rank path 608 would consist of cluster $Z_2$ and content $402_5$ and rank path 610 would consist of cluster $Z_3$ and content $402_6$.

Thereafter, the total rank values for each of contexts $404_3$, $404_9$, and $404_{11}$ can be calculated. First, a product of the rank values for each of the rank paths 604-610 is computed. These products are then summed for each of the contexts $404_3$, $404_9$, and $404_{11}$ to obtain a total rank value for each of contexts $404_3$, $404_9$, and $404_{11}$. For example, as described above, context $404_3$ is associated with only rank path 604, consisting of cluster $Z_2$ and content $402_5$. Thus, based on the rank values in FIG. 6, the total rank value for context $404_3$ is given by R1×0.2×0.7 or 0.14×R1. Similarly, context $404_9$ is associated with only rank path 606, consisting of cluster $Z_2$ and content $402_5$. Thus, based on the rank values in FIG. 6, the total rank value for context $404_9$ is given by R1×0.2×0.1 or 0.02×R1. Finally, context $404_{11}$ is associated with paths 608 and 610. Thus, based on the rank values in FIG. 6, the total rank value for context $404_{11}$ is given by the sum of R1×0.2×0.2 and R2×0.5×1.0, i.e., 0.04×R1+0.5×R2. Thus depending of the rank values of R1 and R2, an order list or ranking of the contexts $404_3$, $404_9$, and $404_{11}$ can be generated and used to determine rules for rules database 216.

The exemplary methods described above with respect to FIGS. 5 and 6 are principally directed to the selection of contexts for a particular invitational content. However, these methods can also be used to identify invitational content for a particular context. In such configuration, the process is essentially the same. That is, the most similar existing contexts for a new context are selected, the most relevant clusters for each of the existing contexts are identified, the most relevant content associated with the identified clusters is identified, and total rank values are computed to generate an ordered list of the delivered invitational content.

Further, the exemplary methods described above can be used to determine whether new invitational content is appropriate for a new context or vice versa. For example, in the case of determining whether a new invitational content is appropriate for a new context, the described process in FIGS. 5 and 6 can be performed. Thereafter, the similarity between the new context and the existing contexts in the order list can be determined. If the similarity value for at least one of the existing contexts meets some criteria, such as a threshold value, then the new context can be deemed appropriate for the new invitational content. Similarly, when determining whether a new context is appropriate for a new invitational content, once the ordered list of delivered invitational content for the new context is generated, similarity values can be obtained for the new content versus the delivered invitational content in the ordered list. Thus, if the similarity value for at least one of the delivered invitational content meets some criteria, such as a threshold value, then the new invitational content can be deemed appropriate for the new context.

In the various embodiments, content delivery system 206 can be configured to permit users to adjust the operation and configuration of the various components of content delivery system 206. Accordingly, a user interface can be provided for communicating with a user interface (UI) module 230 for performing such tasks. Further, the UI module 230 can be configured to provide different levels of access based on authenticating different types of users. For example, administrative users can utilize the user interface and UI module 230 for specifying and/or modifying information regarding the primary content providers 210, the secondary content providers 214, user terminals 202, and end users. Administrative users can also utilize the user interface and UI module 230 for specifying operating parameters for the various interfaces, modules, engines, or databases of content delivery system 206. Further, administrative users can also utilize the user interface and UI module 230 for manually or directly adjusting any of the entries in the databases of content delivery system 206.

In addition to providing access to administrative users, the user interface and UI module 230 can also be configured to provide access to end users associated with primary content providers 210 and end users associated with secondary content providers. In the case of end users associated with primary content providers 210, the user interface and UI module 230 can be configured to allow such end users to, for example, update existing content from primary content providers 210 with the content delivery system 206, register new content or new primary content providers with the content delivery system 206, and/or specify preferences for selecting content from secondary content providers 214. In another example, the user interface and UI module 230 can include analysis tools for evaluating performance of content from the primary content providers 210, such as the performance of content with respect to the user terminals and/or content from the secondary content providers 214. In the case of end users associated with secondary content providers 214, the user interface and UI module 230 can be configured to allow these end users to, for example, update existing content from secondary content providers 214 with the content delivery system 206, register new content or new secondary content providers with the content delivery system 206, or specify preferences for selecting primary content providers 214. In another example, the user interface and UI module 230 can include analysis tools for evaluating performance of content from the secondary content providers 214, such as the performance of content with respect to the user terminals 202 and/or content from the primary content providers 210.

In the various embodiments, the user interface for the UI module 230 can be accessed via an end user terminal in communication with the content delivery system 206. For example, the end user terminal can be one of user terminals 202, a user interface device associated with any of content providers 210 and 214, or any user interface device or system locally or remotely connected to content delivery system 206. The user interface and UI module 230 can be configured to operate in a variety of client modes, including a fat client mode, a thin client mode, or a hybrid client mode, depending on the storage and processing capabilities of the content delivery system 206 and/or the end user terminal. Therefore, a user interface for UI module 230 can be implemented as a standalone application operating at the end user terminal in some embodiments. In other embodiments, web browser-based portal can also be used to provide the user interface for UI module 230. Any other configuration to remotely or locally accessing content delivery system 206 can also be used in the various embodiments.

Although the user interface and UI interface 230 are described above as providing specific types of functionality for specific types of end users, the user interface and UI module 230 can also be configured to allow other interactions between end users and the content delivery system 206. For example, the user interface and UI module 230 can be used to specify any of the parameters, weights, or any other variables for the systems and methods described herein. In another example, the user interface can also be user to view, analyze, and/or modify any final or intermediate results or data generated by any of the systems and methods described herein. In yet another example, the user interface and UI module 230 can also provide a reporting/analysis interface area designed for mining/analyzing performance of content from the secondary providers in terms of CTR, eCPM, cost measures, revenue measures, etc. Additionally, UI module 230 can be configured to sends notifications and alerts to users associated with primary content providers 210 (via email, messaging, etc.) when a campaign runs low, a budget runs low, or any other event of interest occurs. Additionally, the UI module 230 can also send daily/weekly/monthly reports of campaign delivery performance and suggestions for optimization to the content providers 210 and 214.

Other implementations according to these examples include non-transitory computer-readable media for carrying or having computer-executable instructions or data structures stored thereon. Such computer-readable media can be any available media that can be accessed by a general purpose or special purpose computer. By way of example, and not limitation, such tangible computer-readable media can include RAM, ROM, EEPROM, CD-ROM or other optical disk storage, magnetic disk storage or other magnetic storage devices, or any other medium which can be used to carry or store desired program code means in the form of computer-executable instructions or data structures.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Communication at various stages of the described system can be performed through a local area network, a token ring network, the Internet, a corporate intranet, 802.11 series wireless signals, fiber-optic network, radio or microwave transmission, etc. Although the underlying communication technology may change, the fundamental principles described herein are still applicable.

The various embodiments described above are provided by way of illustration only and should not be construed as limiting. Those skilled in the art may recognize various modifications and changes that may be made while following the example embodiments and applications illustrated and described herein, and without departing from the true spirit and scope of the present disclosure.

The invention claimed is:

1. A non-transitory computer-readable medium having code for causing a computer to perform a method stored thereon, the method comprising:
    accessing a database identifying clusters associating delivered invitational content and known contexts, first rank values measuring a relation between the clusters and the delivered invitational content, second rank values measuring a relation between the clusters and the known contexts, and content metadata for the delivered invitational content;
    computing third rank values for the delivered invitational content based on the content metadata, each of the third rank values measuring a similarity between a candidate invitational content and one of the delivered invitational content;
    identifying the delivered invitational content in the database similar to the candidate invitational content, the clusters associated with the identified content, and the known contexts associated with the identified clusters;
    computing total rank values for the identified known contexts, wherein for each of the identified known contexts the computing comprises:
        identifying one or more rank paths comprising a one of the identified clusters associated with a one of the identified known contexts and a one of the identified delivered invitational content,
        calculating a product of the first, second, and third rank values associated with each of the one or more rank paths to generate a rank path product for each of the one or more rank paths, and
        calculating a total rank value for the one of the identified known contexts as a sum of the rank path products for each of the one or more rank paths associated with the one of the identified known contexts; and
    generating an ordered list of the identified known contexts using the total rank values for the identified known contexts.

2. The computer-readable medium of claim 1, the method further comprising:
    selecting a context for the candidate invitational content based on the ordered list.

3. The computer-readable medium of claim 1, wherein accessing the database further comprises:
    assembling an input data set based on performance data for the delivered invitational content in the known contexts, content similarity data for the delivered invitational content, and context similarity data for the known contexts;
    identifying the clusters based on the input data set;
    generating the first rank values and second rank values based on statistical characteristics of the clusters; and
    storing a dataset for the database, the dataset comprising at least the delivered invitational content, the known contexts, the identified clusters, the first rank values, the second rank values, and the content metadata.

4. A method, comprising:
    accessing a database identifying clusters associating delivered invitational content and known contexts, first rank values measuring a relation between the clusters and the delivered invitational content, second rank values measuring a relation between the clusters and the known contexts, and context metadata for the delivered invitational content;
    computing, using a processor, third rank values for the known context based on the context metadata, each of the third rank values measuring a similarity between a candidate context and one of the known contexts;
    identifying the known contexts in the database similar to the candidate context, the clusters associated with the identified contexts, and the delivered invitational content associated with the identified clusters;
    computing, using the processor, total rank values for the identified content, wherein for each of the identified content the computing comprises:

identifying one or more rank paths comprising a one of the identified clusters associated with a one of the identified content and a one of the identified contexts, calculating a product of the first, second, and third rank values associated with each of the one or more rank paths to generate a rank path product for each of the one or more rank paths, and calculating a total rank value for the one of the identified content as a sum of the rank path products for each of the one or more rank paths associated with the one of the identified content; and generating an ordered list of the identified content using the total rank values for the identified content.

5. The method of claim 4, further comprising selecting an invitational content for the candidate context based on the ordered list.

6. The method of claim 4, wherein accessing the database further comprises:

assembling an input data set based on performance data for the delivered invitational content in the known contexts, content similarity data for the delivered invitational content, and context similarity data for the known contexts;

identifying the clusters based on the input data set;

generating the first rank values and second rank values based on statistical characteristics of the clusters; and storing a dataset for the database, the dataset comprising at least the delivered invitational content, the known contexts, the identified clusters, the first rank values, the second rank values, and the context metadata.

7. A system comprising:

a processor;

a storage element for storing a relational database identifying clusters comprising delivered invitational content and known contexts, first rank values measuring a relation between the clusters and the delivered invitational content, second rank values measuring a relation between the clusters and the known contexts, content metadata for the delivered invitational content, and context metadata for the existing metadata content;

a communications interface for receiving at least a first requisition type comprising a candidate invitational content and a request for identifying at least one context for the candidate invitational content; and a request processing element, wherein responsive to the first requisition type, the request processing element is configured to computing third rank values for the delivered invitational content measuring a similarity between the candidate invitational content and the delivered invitational content, identifying the delivered invitational content similar to the candidate invitational content, identifying the clusters associated with the identified content, identifying the known contexts associated with the identified clusters, and generating an ordered list of identified contexts, wherein generating an ordered list of identified contexts comprises:

identifying one or more rank paths comprising a one of the identified clusters associated with a one of the identified contexts and a one of the identified content, calculating a product of the first, second, and third rank values associated with each of the rank paths to generate a rank path product for each of the rank paths, calculating a total rank value for the one of the identified contexts as a sum of the rank path products for each of the one or more rank paths associated with the one of the identified content, and ranking each of the identified context in the order list according to an associated total rank value.

8. The system of claim 7, wherein the request processing element is further configured for selecting a context for the candidate invitational content based on the ordered list.

9. The system of claim 7, further comprising a database processing element configured for:

assembling an input data set based on performance data for the delivered invitational content in the known contexts, delivered invitational content similarity data for the delivered invitational content, and context similarity data for the known contexts;

identifying the clusters based on the input data set;

generating the first rank values and second rank values based on statistical characteristics of the clusters; and storing a dataset for a relational database, the dataset comprising at least the delivered invitational content, the known contexts, the identified clusters, the first rank values, the second rank values, the content metadata, and the context metadata.

10. The system of claim 7, wherein the communications interface is further configured for receiving at least a second requisition type comprising a candidate context and a request for identifying at least one invitational content for the candidate context, wherein responsive to the second requisition type, the request processing element is configured for computing fourth rank values for the known contexts measuring a similarity between the candidate context and the known contexts, identifying the known contexts similar to the candidate context based on the fourth rank values, identifying the clusters associated with the identified contexts based on the second rank values, identifying the delivered invitational content associated with the identified clusters based on the first rank values, and generating an ordered list of identified content based on the first, second, and fourth rank values associated with the identified contexts, the identified clusters, and the identified content.

11. A method, comprising:

accessing a database identifying clusters associating delivered invitational content and known contexts, first rank values measuring a relation between the clusters and the delivered invitational content, and second rank values measuring a relation between the clusters and the known contexts;

computing, using a processor, third rank values for the delivered invitational content, each of the third rank values measuring a similarity between a candidate invitational content and one of the delivered invitational content;

identifying contexts based on a cluster association between a known context and delivered invitational content similar to the candidate invitational content; and generating an ordered list of the identified contexts based on total rank values for the known contexts, wherein computing, using the processor, a total rank value comprises:

identifying one or more rank paths comprising a one of the identified clusters associated with a one of the identified contexts and a one of identified delivered invitational content, calculating a product of the first, second, and third rank values associated with each of the one or more rank paths to generate a rank path product for each of the rank paths, and calculating a total rank value for the one of the identified contexts as a sum of the rank path products for each of the rank paths associated with the one of the identified contexts.

12. A non-transitory computer-readable medium having code for causing a computer to perform a method stored thereon, the method comprising:
- accessing a database identifying clusters associating delivered invitational content and known contexts, first rank values measuring a relation between the clusters and the delivered invitational content, and second rank values measuring a relation between the clusters and the known contexts;
- computing third rank values for the known contexts, each of the third rank values measuring a similarity between a candidate context and one of the known contexts;
- identifying content based on a cluster association between delivered invitational content and known contexts similar to the candidate context; and
- generating an ordered list of the identified content based on total rank values for the identified content, wherein computing a total rank value comprises:
- identifying one or more rank paths comprising a one of the identified clusters associated with a one of identified known contexts and a one of the identified content,
- calculating a product of the first, second, and third rank values associated with each of the one or more rank paths to generate a rank path product for each of the rank paths, and calculating a total rank value for the one of the identified content as a sum of the rank path products for each of the rank paths associated with the one of the identified content.

* * * * *